Patented Aug. 15, 1950

2,518,497

UNITED STATES PATENT OFFICE 2,518,497

UNSATURATED FATTY ACID MODIFIED ROSIN ESTERS AND PROCESS OF PREPARING SAME

John B. Rust, Montclair, N. J., assignor, by direct and mesne assignments, of one-half to Montclair Research Corporation, a corporation of New Jersey, and one-half to Ellis-Foster Company, a corporation of New Jersey No Drawing. Application March 15, 1946, Serial No. 654,798

16 Claims. (Cl. 260—22)

The present invention relates to improved modified rosin esters and to the process for the preparation of the same. More particularly it relates to modified rosin esters comprising a polyhydric alcohol esterified with rosin or other unsaturated natural resin acid and a polycarboxylic acid monoester of a beta-unsaturated monohydric alcohol of from 3 to 4 carbon atoms, wherein a part of the rosin is replaced with the acids derived from saponified drying or semi-drying oils such as raw tung oil acids, linseed oil acids, cottonseed oil acids, soya bean oil acids, dehydrated castor oil acids, corn oil acids, perilla oil acids, menhaden oil acids, and the like.

There is disclosed in my copending applications, Serial No. 531,117, filed April 14, 1944, now Patent No. 2,398,668, April 16, 1946, and Serial No. 534,531, filed May 6, 1944, now Patent No. 2,398,669, April 16, 1946 (entitled "Modified Rosin Esters and Process of Making Same"), modified rosin esters which are particularly adapted to drying oil varnish formulations. These modified rosin esters are prepared by heating together rosin or any other natural resin acid, a polyhydric alcohol and a monoalkenyl ester of a dicarboxylic acid to secure a drying oil-reactive resin having a low acid number and a substantially high softening point. Since these resins are drying oil-reactive they are particularly adapted to varnish formulations where soft oils are employed. I have now found, and this is the subject of the present application, that varnish bases may be prepared directly by co-reaction of suitable proportions of rosin, polyhydric alcohol, acids derived from saponified drying or semi-drying oils, and a monoalkenyl ester of a polycarboxylic acid to give heat-hardening siccative products.

It is, theerfore, an object of the present invention to provide a substantially neutral modified rosin ester which will air-dry in the presence of metallic driers to hard, tough, water-resistant films.

It is a further object of this invention to provide a substantially neutral modified rosin ester which is heat hardening and which may be baked in the form of films to hard flexible, non-yellowing coatings with or without driers.

It is a still further object to provide a siccative varnish base which may be utilized as a baked decorative coating for metals.

Other objects and advantages of the present invention will become apparent from the more detailed description set forth below, it being understood that such description is given by way of explanation and illustration only and should not be considered as limiting the scope of the present invention as numerous variations are possible without departing from the teachings herein.

The process of the present invention comprises the reaction of rosin or any other natural resin acid, drying or semi-drying oil acids, and a polyhydric alcohol with a monoalkenyl ester of a dicarboxylic acid at a temperature of 120–250° C. in a suitable reactor until all of the water of reaction has been removed. Heating is thereafter continued at 250–300° C. until the resulting product possesses a suitable viscosity. Preferably the natural resin acids, unsaturated oil fatty acids and polyhydric alcohol are first heated together until an intermediate hyroxyl-containing ester is formed and then the monoalkenyl dicarboxylate is added and heating continued until the esterification is substantially complete as shown by viscosity and acid number. The product is a light-colored, clear base of acid number of 10 to 30, adapted to form a varnish by adding a thinner and driers. The varnish forms a vehicle for enamels, particularly for white enamels. In the reaction the amount of fatty acids ranges from about 0.5 to 4 times the weight of the natural resin acids, the alkenyl monoester may vary from about 5% to 50% (preferably from 10% to 25%) of the combined weight of the fatty acids and natural resin acids, and the polyhydric alcohol is equivalent to that amount which is sufficient to react with or neutralize substantially all the acidic reactants to give a product of low acid number.

An esterification catalyst such as para toluene sulphonic acid may be employed in order to reduce the time of reaction, although this is not necessary. The esterification catalyst may be removed or allowed to remain, as only 0.1% to 0.5% is sufficient to completely esterify the polyhydric alcohol.

Among the polyhydric alcohols suitable for the production of these new modified rosin esters are pentaerythritol, glycerol, polypentaerythritol, diethylene glycol, trimethylol propane, sorbitol, mannitol, dihydroxy ethoxy benzene, and the like. Among the unsaturated resin acids applicable for use in the preparation of these new esters are abietic acid, rosin, and the unsaturated resin acids obtained from the saponification of such natural resins or gums as copals, damar gum, gum elemi, and the like. Among the unsaturated oil fatty acids employed in the teachings of this invention are raw tung oil acids, oiticica oil acids, linseed oil acids, corn oil acids, castor oil acids, tall oil, cottonseed oil acids, perilla oil acids, menhaden oil acids, soya bean oil acids and the like. Among the monoalkenyl esters of dicarboxylic acids employed in the present invention are included the monoesters of such beta-unsaturated monohydric alcohols as allyl alcohol, methallyl alcohol, crotyl alcohol, propargyl alcohol, butenyl alcohol and such dicarboxylic acids as maleic acid, fumaric, succinic, phthalic, adipic, sebacic, itaconic, citraconic, and the like. Also, among the monoalkenyl esters may be included the monoesters of the above mentioned unsaturated monohydric alcohols and the polycarboxylic acids or adducts prepared from conjugated diolefins (cyclopentadiene, butadiene, 2-methylpentadiene, isoprene, and the like) and alpha-beta-unsaturated dicarboxylic acids (maleic, fumaric, itaconic, citraconic, and the like).

The modified rosin esters, (containing 0.005% cobalt as cobalt naphthenate based upon the oil acids) when poured as a solution and baked at 120–125° C. for 15 to 30 minutes, form hard, tough films which are completely resistant to tap water.

These esters are compatible with urea-formaldehyde, melamine-formaldehyde, phenolic resins, alkyd resins, and the like and may therefore be utilized to form numerous modified resins useful to the art. Also they are compatible with such monomeric vinyl derivatives as styrene, vinyl acetate, ethyl acrylate, acrylonitrile, methyl methacrylate, and the like. When the modified rosin esters of the present invention are reacted with the above vinyl derivatives, products are secured which are useful as baked coatings.

The modified rosin esters of the present invention possess a variety of uses, particularly in baked or air-dried coatings. Furthermore, they may be formulated into water paints since they are readily emulsifiable. Films of these modified rosin esters are fast drying thus making them ideally suitable in water paints as well as in wood and metal coatings.

The following examples are given to illustrate the preparation of the modified esters of this invention. All proportions are in parts by weight.

*Example 1.*—100 parts of linseed oil acids, 50 parts of WW rosin, and 22.7 parts of glycerol are heated together in a 3-neck flask equipped with a stirrer, thermometer, and water trap connected to a water-cooled condenser. Heating is carried out at 200–220° C. for 6 hours, there being collected 9.0 parts of water of reaction. 28 parts of monoallyl maleate are then added and heating continued at 200–250° C. for 6¼ hours. The resulting varnish base could be drawn into a string 12″–15″ in length and possesses an acid number of 19. It is thinned with V. M. and P. naphtha to give a varnish containing 50% solids.

A film of the resulting varnish containing 0.005% cobalt as cobalt naphthenate based upon the oil acids baked to a hard, tough film in ½ hour at 120° C. The baked film did not yellow and possesses a Sward rocker hardness of 87. It did not cloud when immersed in tap water for 48 hours.

A film of the resulting varnish containing 0.6% lead as lead naphthenate and 0.06% cobalt as cobalt naphthenate based upon the oil acids air-dried to a tack-free film in 6 hours, and after 24 hours possessed a Sward rocker hardness of 59.

*Example 2.*—100 parts of linseed oil acids, 50 parts of WW rosin and 27 parts of Pentek (commercial grade pentaerythritol) are heated together in a 3-neck flask equipped with a stirrer, thermometer, and water-trap connected to a water-cooled condenser. Heating is carried out at 200–220° C. for 6¼ hours, there being collected 8.7 parts of water of reaction. 32 parts of monoallyl maleate are added and heating continued at 200–250° C. for 7 hours. The resulting varnish base could be drawn into a string 12″–15″ in length and possesses an acid number of 27. It is thinned with V. M. and P. naphtha to give a varnish containing 50% solids.

A film of the resulting varnish containing 0.005% cobalt as cobalt naphthenate (based upon the oil acids) baked to a hard, tough film in ½ hour at 120° C. The baked film did not yellow and possessed a Sward rocker hardness of 89. It did not cloud when immersed in tap water for 48 hours.

A film of the resulting varnish containing 0.6% lead as lead naphthenate and 0.06% cobalt as cobalt naphthenate based upon the oil acids air-dried to a tack-free film in 5½ hours, and after 24 hours possessed a Sward rocker hardness of 57.

*Example 3.*—100 parts of linseed oil acids, 50 parts of WW rosin and 23.2 parts of glycerol are heated together in a 3-neck flask equipped with a stirrer, thermometer, and water-trap connected to a water-cooled condenser. Heating is carried out at 200–220° C. for 6 hours, there being collected 8.6 parts of water reaction. 25.5 parts of monoallyl maleate are added and heating continued at 200–250° C. for 7½ hours. The resulting varnish base could be drawn into a string 12″–15″ in length and possesses an acid number of 21. It is thinned with V. M. and P. naphtha to give a varnish containing 50% solids.

A film of the varnish containing 0.005% cobalt as cobalt naphthenate based upon the oil acids baked to a hard, tough film in ½ hour at 120° C. The baked film did not yellow, and possessed a Sward rocker hardness of 75. It clouded slightly during immersion in tap water for 48 hours.

A film of the resulting varnish containing 0.6% lead as lead naphthenate and 0.06% cobalt as cobalt naphthenate based upon the oil acids air-dried to a tack-free film in 7 hours and after 24 hours possessed a Sward rocker hardness of 51.

*Example 4.*—100 parts of linseed oil acids, 100 parts of WW rosin and 30.9 parts of glycerol are heated together in a 3-neck flask equipped with a stirrer, thermometer, and water-trap connected to a water-cooled condenser. Heating is carried out at 200–220° C. for 8 hours, there being collected 11.1 parts of water of reaction. 34 parts of monoallyl maleate are added and heating continued at 200–250° C. for 7 hours. The resulting varnish base could be drawn into a string 12″–15″ in length and possesses an acid number of 19. It is thinned with V. M. and P. naphtha to give a varnish containing 50% solids.

A film of the varnish containing 0.005% cobalt as cobalt naphthenate based upon the oil acids baked to a hard film in ½ hour at 120° C. The baked film did not yellow and possesses a Sward rocker hardness of 91. It did not cloud during immersion in tap water for 48 hours.

A film of the resulting varnish containing 0.6% lead as lead naphthenate and 0.06% cobalt as cobalt naphthenate based upon the oil acids dried to a tack-free film in 4¼ hours and possessed a Sward rocker hardness of 69.

*Example 5.*—100 parts of linseed oil acids, 36.8 parts of WW rosin and 21.2 parts of glycerol are heated together in a 3 neck flask equipped with a stirrer, thermometer, and water-trap connected to a water-cooled condenser. Heating is carried out at 200–220° C. for 6½ hours, there being collected 7.9 parts of water of reaction. 22.2 parts of monoallyl maleate are added and heating continued at 200–250° C. for 6¼ hours. The resulting varnish base could be drawn into a string 12″–15″ in length and possesses an acid number of 17. It is thinned with V. M. and P. naphtha to give a varnish containing 50% solids.

A film of the varnish containing 0.005% cobalt as cobalt naphthenate based upon the oil acids baked to a hard film in ½ hour at 120° C. The baked film did not yellow and possessed a Sward rocker hardness of 73. It became somewhat hazy after being immersed in tap water for 48 hours.

A film of the varnish containing 0.6% lead as lead naphthenate, 0.06% cobalt as cobalt naphthenate based upon the oil acids air-dried to a tack-free film in 6¼ hours. After 48 hours the dried film possessed a Sward rocker hardness of 57.

*Example 6.*—100 parts of soya bean oil acids, 50 parts of WW rosin, and 23.2 parts of glycerol are heated together in a 3-neck flask equipped with a stirrer, thermometer, and water-trap connected to a water-cooled condenser. Heating is carried out at 200–220° C. for 7 hours, there being collected 8.9 parts of water of reaction. 25.5 parts of monoallyl maleate are added and heating continued at 200–250° C. for 7½ hours. The resulting varnish base could be drawn into a string 12″–15″ in length and possesses an acid number of 24. It is thinned with V. M. and P. naphtha to give a varnish containing 50% solids.

A film of the varnish containing 0.005% cobalt as cobalt naphthenate based upon the oil acids baked to a hard film in ½ hour at 120° C. The baked film did not yellow and possessed a Sward rocker hardness of 73. It became somewhat hazy after being immersed in tap water for 48 hours.

A film of the varnish containing 0.6% lead as lead naphthenate and 0.06% cobalt as cobalt naphthenate based upon the oil acids air-dried to a hard tack-free film in 6 hours. After 48 hours the dried film possessed a Sward rocker hardness of 57.

*Example 7.*—100 parts of cottonseed oil acids, 50 parts of WW rosin and 29 parts of Pentek (commercial grade pentaerythritol) are heated together in a 3-neck flask equipped with a stirrer, thermometer, and water-trap connected to a water-cooled condenser. Heating is carried out at 200–220° C. for 7½ hours, there being collected 9.1 parts of water of reaction. 34.7 parts of monoallyl maleate are added and heating continued at 200–260° C. for 8 hours. The resulting varnish base could be drawn into a string 12″–15″ in length and possesses an acid number of 34. It is thinned with V. M. and P. naphtha to give a varnish containing 50% solids.

A film of the varnish containing 0.005 cobalt as cobalt naphthenate based upon the oil acids baked to a hard film in ½ hour at 120° C. The baked film did not yellow, and possesses a Sward rocker hardness of 63. It clouded after 24 hours immersed in tap water.

A film of the varnish containing 0.6% lead as lead naphthenate and 0.06% cobalt as cobalt naphthenate based upon the oil acids air-dried to a tack-free film in 8 hours. After 48 hours the dried film possessed a Sward rocker hardness of 43.

*Example 8.*—81.2 parts of linseed oil acids, 40.8 parts of WW rosin, and 21.8 parts of Pentek (technical grade of pentaerythritol) are heated together at 200–240° C. for 6 hours. 37.4 parts of monoallyl phthalate are added and heating continued at 180–220° C. for 8¼ hours. A light-colored, clear varnish base is formed which could be drawn into a string 15″ in length. It is thinned to 50% solids with V. M. and P. naphtha.

The varnish, containing 0.05% cobalt as cobalt naphthenate based on the oil acids, baked for ½ hour at 120° C., was hard and tough. It possessed a Sward rocker hardness of 49.

The varnish, containing 0.6% lead as lead naphthenate and 0.06% cobalt as cobalt naphthenate based on the oil acids, air-dried to a hard tack-free film in 6¼ hours.

Having thus set forth my invention, I claim:

1. A resinous reaction product adapted for making coating compositions, comprising an esterified mixture produced at from 120° C. to 250° C. of a polyhydric alcohol with an unsaturated natural resin acid, a monocarboxylic acid selected from the group consisting of unsaturated fatty acids obtained by hydrolysis of drying and semi-drying oils, and a dicarboxylic acid monoester of a beta-unsaturated monohydric alcohol of from 3 to 4 carbon atoms, the fatty acids being from about 0.5 to 4 times the weight of the natural resin acids, the weight of the dicarboxylic acid monoester being from 5% to 50% of the weight of the fatty acids plus natural resin acids and the amount of the polyhydric alcohol being sufficient to neutralize substantially all the acidic reactants.

2. A resinous reaction product adapted for making coating compositions, comprising a polyhydric alcohol esterified at from 120° C. to 250° C. with rosin, an acid selected from the group consisting of unsaturated fatty acids obtained by hydrolysis of drying and semi-drying oils, and a dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the polyhydric alcohol being sufficient to react with substantially all the acidic reactants.

3. A resinous reaction product adapted for making coating compositions, comprising glycerol esterified at from 120° C. to 250° C. with rosin, an acid selected from the group consisting of unsaturated fatty acids obtained by hydrolysis of drying and semi-drying oils, and a dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the glycerol being sufficient to neutralize substantially all the acidic reactants.

4. A resinous reaction product adapted for making coating compositions, comprising pentaerythritol esterified at from 120° C. to 250° C. with rosin, an acid selected from the group consisting of unsaturated fatty acids obtained by hydrolysis of drying and semi-drying oils, and a dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the pentaerythritol being in 5. A resinous reaction product adapted for making coating compositions, comprising glycerol esterified at from 120° C. to 250° C. with rosin, linseed oil fatty acids, and a dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the glycerol being sufficient to react with substantially all the acidic reactants.

6. A resinous reaction product adapted for making coating compositions, comprising glycerol esterified at from 120° C. to 250° C. with rosin, soya bean oil fatty acids, and a dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the glycerol being sufficient to react with substantially all the acidic reactants.

7. A resinous reaction product adapted for making coating compositions, comprising pentaerythritol esterified at from 120° C. to 250° C. with rosin, linseed oil fatty acids, and dicarboxylic acid monoester of a beta-unsaturated monohydric alcohol of from 3 to 4 carbon atoms, the fatty acids being from about 0.5 to 4 times the weight of the rosin, the weight of the dicarboxylic acid monoester being from 5% to 50% of the weight of the rosin plus fatty acids, and the amount of the pentaerythritol being sufficient to neutralize substantially all the acidic reactants.

8. The resinous composition of claim 2 wherein the dicarboxylic acid monoester is monoallyl maleate.

9. The resinous composition of claim 2 wherein the dicarboxylic acid monoester is monoallyl phthalate.

10. The process which comprises heating at reaction temperature at from 120° C. to 250° C. a polyhydric alcohol, rosin, and an acid selected from the group consisting of unsaturated fatty acids obtained by hydrolysis of drying and semi-drying oils, to form an intermediate hydroxyl-containing ester, and then adding a dicarboxylic acid monoester of a beta-unsaturated monohydric alcohol of from 3 to 4 carbon atoms and heating at from 120° C. to 250° C. to form a resinous composition adapted for coating compositions; the fatty acids being from about 0.5 to 4 times the weight of the rosin, the weight of the dicarboxylic acid monoester being from 5% to 50% of the weight of the rosin plus fatty acids, and the amount of the polyhydric alcohol being sufficient to react with substantially all the acidic reactants.

11. A process of producing a resinous reaction product adapted for making coating compositions, comprising heating at from 120° C. to 250° C. a dicarboxylic acid monoester of a beta-unsaturated monohydric alcohol of from 3 to 4 carbon atoms with an ester of a polyhydric alcohol, an unsaturated natural resin acid, and a monocarboxylic acid selected from the group consisting of unsaturated fatty acids obtained by hydrolysis of drying and semi-drying oils; the monocarboxylic acid being from about 0.5 to 4 times the weight of the natural resin acid, the weight of the monoester being from 5% to 50% of the weight of the monobasic acid plus resin acid, and the amount of the polyhydric alcohol being sufficient to neutralize substantially all the acidic reactants.

12. The product of claim 1, further heated at 250° C. to 300° C. to modify its viscosity.

13. The product of claim 12 in which the resin acid is rosin.

14. The product of claim 13 in which the polyhydric alcohol is glycerol.

15. The product of claim 14 in which the fatty acids are linseed oil fatty acids.

16. The product of claim 15 in which the monoester is monoallyl maleate.

JOHN B. RUST.

REFERENCES CITED

The following references are of record in the file of this patent:

UNITED STATES PATENTS

| Number | Name | Date |
| --- | --- | --- |
| 1,921,756 | Kienle | Aug. 8, 1933 |
| 2,181,054 | Hampton | Nov. 21, 1939 |
| 2,194,894 | Ellis | Mar. 26, 1940 |
| 2,280,256 | Patterson | Apr. 21, 1942 |